United States Patent [19]

Buran et al.

[11] Patent Number: 4,542,111

[45] Date of Patent: Sep. 17, 1985

[54] SPRAY POWDER FOR THE MANUFACTURE OF WEAR RESISTANT AND TEMPERATURE RESISTANT COATINGS

[75] Inventors: Ulrich Buran, Burscheid; Manfred Fischer, Leichlingen; Hans J. Neuehäuser, Bergisch-Gladbach, all of Fed. Rep. of Germany

[73] Assignee: Goetze AG, Burscheid, Fed. Rep. of Germany

[21] Appl. No.: 555,515

[22] Filed: Nov. 28, 1983

[30] Foreign Application Priority Data

Nov. 29, 1982 [DE] Fed. Rep. of Germany ....... 3244073

[51] Int. Cl.⁴ ...................... C04B 35/10; C04B 35/46; C04B 35/50

[52] U.S. Cl. ............................... 501/127; 277/235 A; 427/34; 501/134; 501/135; 501/136; 501/152; 501/153

[58] Field of Search ...................... 277/235 A; 427/34; 501/127, 134, 152

[56] References Cited

U.S. PATENT DOCUMENTS

| | | | |
|---|---|---|---|
| 3,278,324 | 10/1966 | Nelson | 427/183 |
| 3,697,091 | 10/1972 | Prasse et al. | 277/235 A |
| 3,926,567 | 12/1975 | Fletcher et al. | 428/403 |
| 4,106,782 | 8/1978 | Hyde et al. | 277/235 A |
| 4,173,518 | 11/1979 | Yamada et al. | 204/67 |
| 4,180,622 | 12/1979 | Burkhard et al. | 427/34 |
| 4,248,440 | 2/1981 | McCormick | 501/152 |
| 4,414,249 | 11/1983 | Ulion et al. | 427/34 |

FOREIGN PATENT DOCUMENTS

| | | | |
|---|---|---|---|
| 2336668 | 8/1974 | Fed. Rep. of Germany . | |
| 2419773 | 11/1974 | Fed. Rep. of Germany | 427/34 |
| 2204503 | 1/1974 | France . | |
| 2186548 | 5/1974 | France . | |
| 56-156773 | 12/1981 | Japan | 427/34 |
| 681250 | 10/1952 | United Kingdom . | |

*Primary Examiner*—Helen M. McCarthy

*Attorney, Agent, or Firm*—Spencer & Frank

[57] ABSTRACT

A spray powder for the manufacture of wear resistant and temperature resistant coatings, the powder comprising 50 to 90 weight percent aluminum oxide ($Al_2O_3$) and 5 to 40 weight percent titanium dioxide ($TiO_2$) with additives in the form of 5 to 30 weight percent lanthanum oxide ($La_2O_3$) and/or niobium oxide ($Nb_2O_5$), possibly together with 30 weight percent calcium carbonate ($CaCO_3$).

10 Claims, No Drawings

SPRAY POWDER FOR THE MANUFACTURE OF WEAR RESISTANT AND TEMPERATURE RESISTANT COATINGS

BACKGROUND OF THE INVENTION

The present invention relates to a spray powder including aluminum oxide and titanium dioxide for the manufacture of wear resistant and high temperature resistant coatings, particularly on the running and friction faces of machine parts, such as piston rings, piston bottoms and the fire lands of pistons as well as the friction faces of synchronizing discs, which are subjected to sliding friction and/or high temperature stresses in internal-combustion engines, the powder being preferably applied in a plasma spraying process.

It is known, for example, according to U.S. Pat. No. 3,697,091, to coat the running faces of piston rings for internal combustion engines, instead of with wear resistant hard chromium or molybdenum coatings, with oxide ceramic layers of aluminum oxide and titanium dioxide or zirconium dioxide, preferably in a plasma spray process. Coatings of this type are distinguished by good wear resistance and resistance against burn traces even under high temperature stresses. Such coatings, however, are still relatively sensitive to thermal shocks so that such coatings, be they in chambered or in sprayed-on form, break out (delaminate) and, as a consequence, may produce great wear on their counterrunning partners.

To overcome this problem, DE-PS 3,033,332 and corresponding U.S. Pat. No. 4,248,440 disclose the addition of yttrium oxide in quantities from 2 to 6 weight percent to plasma spray powders which include aluminum oxide and titanium oxide for coatings of piston rings. The resistance of such coatings to thermal shocks has also been significantly improved in this way without substantially reducing wear resistance and high temperature resistance of the coatings. However, these measures have not been able to completely eliminate all of the drawbacks of the aluminum oxide-titanium dioxide plasma sprayed coatings on piston rings, particularly with respect to their resistance to thermal shocks and as a consequence thereof, with respect to their freedom from breakouts and their poor compatibility with their counterrunning partners.

SUMMARY OF THE INVENTION

It is therefore an object of the present invention to further improve spray powders for producing thermosprayed coatings which contain aluminum oxide and titanium dioxide, the improvement being particularly with respect to the resulting coatings wear resistance, resistance to burn traces, to thermal shocks and, connected therewith, to break-outs as well as the compatibility of the coatings with their counterrunning partners.

Another object of the present invention is to provide such a spray powder which produces thermosprayed coatings which are as easy and cost efficiently to produce and rework as possible and are suitable, in addition to use as coatings on piston rings in chambered or sprayed-on form, also for use as coatings on machine parts subjected to similar stresses in internal-combustion engines, such as the bottoms of pistons or the fire lands of the pistons or for the friction faces of synchronizing discs.

Additional objects and advantages of the present invention will be set forth in part in the description which follows and in part will be obvious from the description or can be learned by practice of the invention. The objects and advantages are achieved by means of the products, instrumentalities and combinations particularly pointed out in the appended claims.

To achieve the foregoing objects and in accordance with its purpose, the present invention provides a spray powder comprising 50 to 90 weight percent aluminum oxide, 5 to 40 weight percent titanium dioxide, and 5 to 30 weight percent of at least one oxide selected from lanthanum oxide ($La_2O_3$) and niobium oxide ($Nb_2O_5$), with up to 30 weight percent calcium carbonate.

It has been found that if only lanthanum oxide is used as additive, this works quite well without the addition of calcium carbonate. In the practice of the present invention, the lanthanum oxide need not necessarily be present as pure lanthanum oxide, but can be a mixture and contain other oxides of the rare earth metals up to about 30 weight percent.

If niobium oxide is used as additive, the latter preferably contains up to a maximum of 30 weight percent calcium carbonate.

It is to be understood that both the foregoing general description and the following detailed description are exemplary and explanatory, but are not restrictive of the invention.

DETAILED DESCRIPTION OF THE INVENTION

Typical plasma spray powders according to the present invention comprise:

50 weight percent aluminum oxide ($Al_2O_3$)
30 weight percent titanium dioxide ($TiO_2$) and
20 weight percent additives comprising either
(1) lanthanum oxide ($La_2O_3$) or
(2) 16% niobium oxide ($Nb_2O_5$) and 4% calcium carbonate or
(3) mixtures including a total of 16% lanthanum oxide ($La_2O_3$) and/or niobium oxide ($Nb_2O_5$) with 4% calcium carbonate.

Preferably, the spray powder is used in the form of mixtures of the individual components. In the practice of the present invention, at least two of the components may also be present in the form of compound powders or pressed together micropellets, or at least two of the components may be used in the form of compounds with one another. The spray powder can contain reaction products of at least two of the oxidic components. Preferably, the grain sizes of the powders employed is between 5 and 106 microns.

The coatings are preferably produced in a plasma spray process employing primary and secondary gases of preferably nitrogen and hydrogen, argon and hydrogen or also nitrogen and argon. The application of the sprayed coatings may here be effected directly onto the machine parts, which are preferably made of cast iron, steel or aluminum and aluminum alloys, respectively, or can be effected onto a previously applied intermediate layer of usually molybdenum, nickel-chromium alloys or nickel-aluminum alloys. A preferred nickel-chromium alloy contains 80 weight percent nickel and 20 weight percent chromium, and a preferred nickel-aluminum alloy contains 95 weight percent nickel and 5 weight percent aluminum.

The coatings may either be sprayed over the entire area or may be sprayed into chamber-like recesses provided on one or both sides of the machine part to fill up these recesses. The sprayed powders are preferably employed to coat piston rings and to cover the entire area or parts of the piston bottoms and/or the fire lands regions of pistons in internal-combustion engines. However, these powders are also suitable for the production of wear resistant coatings on the friction faces of other machine parts, such as, in particular, synchronizing discs.

The spray powders according to the present invention were used for coatings that were plasma sprayed on samples. Wear resistance, heat resistance, thermal shock resistance and break-out resistance were examined and yielded excellent values.

For engine tests in a fast running Diesel automobile engine, piston rings were produced according to the present invention with various powder compositions, in sprayed-on form and in single or double sided chambered form, with and without the use of intermediate layers. After test runs under simulated extreme stresses, the coatings exhibited only slight wear and no burn trace formation at all as well as no break-out phenomena. The cylinder bearing faces which were used as the counterrunning partners were examined and exhibited no significant wear traces at all.

With the use, according to the present invention, of niobium oxide, lanthanum oxide and/or calcium carbonate additives, the known spray powder including aluminum oxide and titanium oxide has thus been significantly improved, particularly with respect to its thermal shock resistance and its break-out resistance, so that it is suitable for the production of coatings on friction stressed machine parts which are subjected to the relatively high thermal stresses of an internal-combustion engine. The significantly improved resistance of these coatings to break-outs seems to have been created by two different effective mechanisms.

It has been found that if only 5 to 10 weight percent lanthanum oxide and/or niobium oxide with calcium carbonate are added, it is primarily only the internal cohesion of the coatings which is improved. If the additive proportions are increased further to up to 30 weight percent, the coatings additionally exhibit a plurality of microscopically small cracks which under stress result in partial or complete relaxation of internal stresses in the coatings so that break-outs of the coating or of parts of the coating are additionaly effectively prevented.

Thus, the present invention provides spray powders on the basis of aluminum oxide and titanium dioxide with which wear resistant and burn trace resistant, as well as simultaneously heat resistant and thermal shock resistant, and thus break-out resistant coatings can be applied by means of a plasma spray process primarily to machine parts which are subjected to thermal stresses in internal-combustion engines. The spray powders employed are economical, particularly because of the use of aluminum oxides and titanium dioxides and the produced coatings can be worked relatively easily after the spraying process.

Particularly good values were obtained with the following spray powders in engine test runs:

Spray Powder 1

55 weight percent aluminum oxide ($Al_2O_3$)
35 weight percent titanium dioxide ($TiO_2$)
8 weight percent niobium oxide ($Nb_2O_5$)
2 weight percent calcium carbonate ($CaCO_3$)

Spray Powder 2

50 weight percent aluminum oxide ($Al_2O_3$)
30 weight percent titanium dioxide ($TiO_2$)
20 weight percent lanthanum oxide ($La_2O_3$)

Spray Powder 3

50 weight percent aluminum oxide ($Al_2O_3$)
30 weight percent titanium dioxide ($TiO_2$)
16 weight percent niobium oxide ($Nb_2O_5$)
4 weight percent calcium carbonate ($CaCO_3$)

The intermediate layers employed preferably comprise a nickel-chromium alloy containing 80 weight percent nickel and 20 weight percent chromium and a nickel-aluminum alloy containing 95 weight percent nickel and 5 weight percent aluminum.

It will be understood that the above description of the present invention is susceptible to various modifications, changes and adaptations, and the same are intended to be comprehended within the meaning and range of equivalents of the appended claims.

What is claimed is:

1. Spray powder containing aluminum oxide and titanium dioxide for the manufacture of wear resistant and break-out resistant coatings, the spray powder consisting essentially of: 50 to 90 weight percent aluminum oxide ($Al_2O_3$), 5 to 40 weight percent titanium dioxide ($TiO_2$), and from 10 up to 30 weight percent of at least one oxide selected from lanthanum oxide ($La_2O_3$), a mixture of lanthanum oxide with up to 30 weight percent other oxides of rare earth metals, niobium oxide ($Nb_2O_5$), and a mixture of niobium oxide with up to 30 weight percent calcium carbonate ($CaCO_3$).

2. Spray powder as defined in claim 1 wherein the spray powder consists essentially of
50 weight percent aluminum oxide ($Al_2O_3$),
30 weight percent titanium dioxide ($TiO_2$),
a total of 16 weight percent niobium oxide ($Nb_2O_3$) and 4 weight percent calcium corbonate ($CaCO_3$).

3. Spray powder as defined in claim 1, wherein the spray powder consists essentially of
50 weight percent aluminum oxide ($Al_2O_3$),
30 weight percent titanium dioxide ($TiO_2$), and
20 weight percent lanthanum oxide ($La_2O_3$).

4. Spray powder as defined in claim 1, wherein the spray powder consists essentially of
50 weight percent aluminum oxide ($Al_2O_3$),
30 weight percent titanium dioxide ($TiO_2$),
16 weight percent of a mixture of lanthanum oxide ($La_2O_3$), and niobium oxide ($Nb_2O_5$) and 4 weight percent of calcium carbonate ($CaCO_3$).

5. Spray powder as defined in claim 1, wherein the spray powder is a mixture of the individual components.

6. Spray powder as defined in claim 1, wherein the spray powder contains micropellets consisting of at least two components which are pressed together.

7. Spray powder as defined in claim 1, wherein the spray powder contains a compound powder consisting of at least two of the components.

8. Spray powder as defined in claim 1, wherein the spray powder contains at least one reaction product of at least two of the oxidic components.

9. Spray powder as defined in claim 1, consisting essentially of 50 to 90 weight percent oxide, 5 to 40 weight percent titanium dioxide, and from 10 up to 30 weight percent lanthanum oxide.

10. Spray powder as defined in claim 1, wherein the grain size of the components employed is between 5 and 106 microns.

* * * * *